United States Patent
Rudolph et al.

(10) Patent No.: US 10,252,814 B2
(45) Date of Patent: Apr. 9, 2019

(54) AUTOMATIC FLIGHT CONTROLLER, AIRCRAFT COCKPIT, METHOD FOR OPERATING AND AUTOMATIC FLIGHT CONTROLLER AND COMPUTER PROGRAM

(71) Applicant: Deutsches Zentrum fuer Luft-und Raumfahrt, Cologne (DE)

(72) Inventors: Michael Rudolph, Braunschweig (DE); Matthias Wies, Muenster (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 0 days.

(21) Appl. No.: 15/621,050

(22) Filed: Jun. 13, 2017

(65) Prior Publication Data
US 2017/0355467 A1 Dec. 14, 2017

(30) Foreign Application Priority Data
Jun. 14, 2016 (DE) .................. 10 2016 110 863

(51) Int. Cl.
*B64D 43/00* (2006.01)
*B64C 13/18* (2006.01)
*B64D 45/00* (2006.01)
*G06F 3/14* (2006.01)

(52) U.S. Cl.
CPC .............. *B64D 43/00* (2013.01); *B64C 13/18* (2013.01); *B64D 45/00* (2013.01); *G06F 3/1423* (2013.01); *G09G 2380/12* (2013.01)

(58) Field of Classification Search
CPC ........ B64D 43/00; B64D 43/02; B64D 45/00; B64C 13/18; G06F 3/1423; G09G 2380/12
See application file for complete search history.

(56) References Cited

U.S. PATENT DOCUMENTS 8,098,175 B2 * 1/2012 Berthou ............... G01C 23/005
340/945
9,132,913 B1 9/2015 Shapiro
2003/0132860 A1 7/2003 Feyereisen
(Continued)

FOREIGN PATENT DOCUMENTS

DE 603 03 832 T2 8/2006
DE 10 2014 101 365 A1 8/2014

*Primary Examiner* — Tom V Sheng
(74) *Attorney, Agent, or Firm* — W & C IP

(57) ABSTRACT

The invention concerns an automatic flight controller with operating elements, by means of which target settings of the automatic flight controller can be set by an operator, and with display elements for data display, wherein the display elements comprise at least two mutually separate displays that are disposed on the front, for example a front panel, of the automatic flight controller, wherein a) the at least two mutually separate displays are high resolution graphical displays and/or
b) the automatic flight controller is designed to display all operating mode awareness-relevant parameters of the automatic flight controller on one or more of the at least two mutually separate displays of the automatic flight controller.

The invention further concerns an aircraft cockpit with such an automatic flight controller as well as a method for operating a flight controller. The invention also concerns a computer program for carrying out the method.

21 Claims, 2 Drawing Sheets

(56) References Cited

U.S. PATENT DOCUMENTS

| | | | |
|---|---|---|---|
| 2004/0059474 A1* | 3/2004 | Boorman | G01C 23/00 701/14 |
| 2005/0085959 A1 | 4/2005 | Feyereisen | |
| 2007/0008188 A1* | 1/2007 | Firra | B64D 43/00 340/973 |
| 2011/0001636 A1* | 1/2011 | Hedrick | B60K 37/02 340/971 |
| 2016/0179327 A1* | 6/2016 | Zammit-Mangion | G01C 23/00 701/7 |

* cited by examiner

AUTOMATIC FLIGHT CONTROLLER, AIRCRAFT COCKPIT, METHOD FOR OPERATING AND AUTOMATIC FLIGHT CONTROLLER AND COMPUTER PROGRAM

FIELD OF THE INVENTION

The invention concerns an automatic flight controller with operating elements, by means of which the target settings of the automatic flight controller can be set by an operator, and with display elements for data display. The invention further concerns an aircraft cockpit with such an automatic flight controller as well as a method for operating a flight controller. The invention also concerns a computer program for carrying out the method.

BACKGROUND

In general, the invention concerns the guidance and control of aircraft, in particular of commercial aircraft. As a rule, according to the current state of the art such aircraft comprise an automatic flight controller that is also referred to as an auto flight system and that comprises functions such as flight director, autopilot and/or automatic thrust control of the engines. In particular in the case of commercial aircraft, such automatic flight controllers comprise a number of operating modes that extend beyond a basic autopilot function, i.e. that are not only designed to maintain a course, but also to comprise programs for fuel-saving flying, automatic altitude changing according to the flight plan or the geographic region and others. According to the current state of the art, an automatic flight controller comprises a flight control unit (FCU) that comprises operating elements and also display elements to a limited extent. By means of the operating elements, an operator, as a rule the pilot or copilot, can set target settings of the automatic flight controller, i.e. can specify target values, for example for flying altitude, flying speed, flight direction etc. The set target values are displayed on a display element of the FCU.

Where the pilot is referred to below, this also applies accordingly to the copilot.

According to the current state of the art, an aircraft cockpit further comprises additional display elements for displaying the significant variables for the pilot and copilot, such as for example flight direction, artificial horizon etc. A primary flight display is usually provided for each of the pilot (flight captain) and for the copilot (first officer). The primary flight display comprises a so-called flight operating mode annunciator (FMA) in each case. In a sub region of the FMA, information about the operating mode of the automatic flight controller is output to a very limited extent. It has been determined from scientific studies that owing to the number of different operating modes of the automatic flight controller and the partially automatically conducted change of operating modes thereof, it is extremely difficult for the pilot to fully estimate the actual flying state of his aircraft when operating with the automatic flight controller. For example, the automatic flight controller can reduce the thrust of the engines owing to the set operating mode, which in some situations may be irritating for the pilot. Nevertheless, the automatic thrust reduction can be useful and can be conducive to safety.

Devices and methods for displaying autopilot information are known from US 2004/0 059 474 A1. A method for indicating aircraft situation information is known from DE 10 2014 101 365 A1. A simplified autopilot system coupled with a touchscreen flight control panel is known from U.S. Pat. No. 9,132,913 B1. An interface for visual display and control for tactical aviation management is known from US 2003/0 132 860 A1. A pictographic mode awareness display for an aircraft is known from US 2005/0 085 959 A1. A standby display aircraft management system is known from US 2007/0 008 188 A1. An aircraft instrument panel is known from DE 603 03 832 T2.

SUMMARY

It is the object of the invention to specify options with which the pilot can estimate the activity and behavior of his aircraft better when the flight controller is activated.

This object is achieved by the invention specified in the independent claims. It has been found during the course of wide-ranging investigations and questioning of commercial pilots that difficulties in estimating the activity of the automatic flight controller can lead to irritation and accordingly also to erroneous actions by the pilot. The invention provides options for giving the pilot improved feedback for the operation of the automatic flight controller, so that the pilot can build up a so-called operating mode awareness in a better way. The operating mode awareness is an information state of the pilot that makes a significant contribution to the safe operation of the aircraft when the automatic flight controller is activated. It has been found that so-called operating mode awareness-relevant parameters of the automatic flight controller can be identified that are already sufficient in limited numbers to bring about the necessary operating mode awareness of the pilot. For this purpose, in particular the following six operating mode awareness-relevant parameters are used:

1. Type and/or name of the currently active operating mode of the automatic flight controller.
2. Set target values of the operating mode.
3. Guidance of the operating mode, i.e. a statement regarding the origin of the set target values (set by the pilot or set automatically based on the programmed flying route).
4. Transitions and transition conditions of the operating modes of the automatic flight controller. Here transitions between operating modes are detected, in particular the conditions under which and how a transition between operating modes takes place.
5. Control behavior of the currently active operating mode. The control behavior describes how the target values are achieved, for example whether a change in altitude is achieved solely by actuating the elevator or additionally by thrust control.
6. Interaction options between operating modes. This parameter indicates which operating modes are active simultaneously with the automatic flight controller or can be activated.

The invention achieves the aforementioned object with an automatic flight controller according to claim 1. Here the display elements comprise at least two mutually separate displays that are disposed on the front of the automatic flight controller, for example on a front panel. It can further be provided that a) the at least two mutually separate displays are high resolution graphical displays and/or
b) the automatic flight controller is designed to display all operating mode awareness-relevant parameters of the automatic flight controller on one or more of the at least two mutually separate displays of the automatic flight controller.

A first improvement compared to the prior art is thus that the display elements comprise at least two mutually separate displays that are disposed on the front of the automatic flight controller. This provides a certain display redundancy. If one of the displays fails or is damaged, then at least the essential part of the relevant data can continue to be displayed on the other display. In an advantageous development of the invention, the display elements comprise three mutually separate displays. This increases the redundancy still further, and the display options are also improved.

By implementing the at least two mutually separate displays as high resolution graphical displays, the display options are considerably expanded and improved compared to the previous state. Owing to the graphic capabilities, in principle any symbols can be displayed that can be selected according to psychological criteria in order to deliver the operating mode awareness of the pilot in a particularly suitable way. The at least two mutually separate displays can in particular be implemented as color graphical displays, for example as TFT displays. In addition, there is more display space for the presentation of relevant data, so that even data that were previously not displayed, but which according to the knowledge of the inventor have great significance as operating mode awareness-relevant parameters, can now be displayed. A high-resolution graphical display can for example be implemented with a resolution of at least 100 ppi, in particular of at least 200 ppi or at least 300 ppi (ppi—pixels per inch).

It is further advantageous that all operating mode awareness-relevant parameters of the automatic flight controller can be displayed on dedicated displays of the automatic flight controller, i.e. they no longer have to be displayed on other image display devices in the cockpit, such as for example the FMA. This has the advantage that the operation and the display of the automatic flight controller are combined and the user does not carry out the target settings on one unit and obtain a display of the data on another remote unit disposed in the cockpit as before. In addition, the available display space on the FMA can be used for the presentation of other data. By the combination of operation and display of the automatic flight controller, in addition the operating mode awareness of the pilot can be increased further, as a connection between settings and displays can also be detected intuitively. The pilot therefore no longer has to provide inputs at one point in the cockpit and read feedback regarding the inputs made at another point as previously.

According to an advantageous development of the invention, the operating elements of the automatic flight controller comprise at least one display operating element, by the actuation of which at least some of the display contents of a display can be moved to another display. In this way, part of the display contents or the entire display contents can be rapidly moved to another display by manual intervention in the event of a failure of a display, so that the pilot continues to be informed with said display contents.

According to an advantageous development of the invention, the at least two displays each comprise an image diagonal of at least 4 inches, for example 5 inches or more. This enables sufficient display space to be provided for the display of most or all of the aforementioned operating mode awareness-relevant parameters. In addition, displays of this size can still be accommodated well in the cockpit of an aircraft.

The aforementioned object is further achieved by an aircraft cockpit with at least one automatic flight controller of the type described above. This also enables the advantages described above to be achieved.

It is advantageous here if the automatic flight controller is integrated within the glare shield of the cockpit. This enables the display elements, in particular the at least two mutually separate displays, to lie within the field of view both of the pilot and also of the copilot. The automatic flight controller can for example be integrated at a central point in the glare shield. The aircraft cockpit can be the aircraft cockpit of a commercial aircraft.

The automatic flight controller does not necessarily have to be fully disposed in the aircraft cockpit or integrated within the glare shield. It is essential that the operating elements and the display elements are disposed at this point. A central computer (microprocessor) of the automatic flight controller can for example also be disposed at another point in the aircraft, for example in a technical compartment.

The aforementioned object is further achieved by a method for operating an automatic flight controller, in particular an automatic flight controller of the type described above, in a cockpit of an aircraft, in particular of a commercial aircraft, wherein information about the operating mode of the automatic flight controller is displayed on an image display device in the cockpit in order to contribute to the operating mode awareness of the pilot necessary for safe operation of the aircraft when the automatic flight controller is activated, wherein one, several or all of the operating mode awareness-relevant parameters below are displayed on the image display device:

a) transition conditions between operating modes of the automatic flight controller,
b) control behavior of the automatic flight controller for achieving set target values,
c) possible interactions of the selected operating mode of the automatic flight controller with other operating modes of the automatic flight controller that can be selected.

In this way, additional significant operating mode awareness-relevant parameters, i.e. the parameters 4 to 6 according to the above list, are displayed and thus communicated to the pilot. In addition to the aforementioned parameters 4 to 6, one, several or all of the further parameters 1 to 3 according to above list can be displayed on the image display device. This enables the operating mode awareness of the pilot to be improved further. The image display device used for the display of said parameters can for example be an existing display element of the automatic flight controller, or one or more of the aforementioned two mutually separate displays. The image display device can also be another image display device in the cockpit, for example image display devices in the primary flight display, for example on the FMA.

For the reasons described above, it is however particularly advantageous if the image display device, on which one, several or all of the operating mode awareness-relevant parameters are displayed, is at least one display element of the automatic flight controller. If there is sufficient display space there, it is particularly advantageous if all operating mode awareness-relevant parameters, in particular the aforementioned parameters 1 to 6, are displayed on one or more display elements of the automatic flight controller. This enables the operating mode awareness of the pilot to be maximized.

According to an advantageous development of the invention, it is provided that a preview of operating mode awareness-relevant parameters is set up by actuating at least one of the display operating elements of the automatic flight controller. By such a preview, the pilot can be given information about how the aircraft behavior changes following a change of the operating mode if said preview is activated.

The display can take place in a similar way to the display of the operating mode awareness-relevant parameters of the currently active operating mode of the automatic flight controller. This enables the pilot to be mentally prepared to deal with imminent altered aircraft behavior and to adapt accordingly.

According to an advantageous development of the invention, it is provided that by actuating at least one display operating element of the automatic flight controller, at least some of the display content of a display element of the automatic flight controller is moved to another display element of the automatic flight controller. This enables said display content to still be displayed in the event of a failure of a display element by moving it to another display element by manual intervention.

According to an advantageous development of the invention, it is provided that at least one operating mode awareness-relevant parameter is displayed at different fixed positions of the image display device depending on whether a flying state of the aircraft changes positively, changes negatively or remains the same for said operating mode awareness-relevant parameter. In this way, the respective change of the flying state is already indicated to the pilot by the position at which the respective parameter is displayed. It has been found that such a display is easier to grasp for the pilot than a purely fixed numerical display always at the same position on the image display device.

According to an advantageous development of the invention, it is provided that at least one operating mode awareness-relevant parameter is displayed at different fixed positions of the image display device depending on whether the target value related to said operating mode awareness-relevant parameter was determined by the pilot or automatically based on the programmed flying route. This enables the image display device to be divided in two, i.e. with a region for displaying the parameter influenced by pilot input and the parameter influenced by automatic target value selection. In connection with the aforementioned triple division of the image display device (positive change, negative change, remaining the same), for example a matrix division of the image display device into six display fields can be implemented. In this way, the operating mode awareness of the pilot is improved further.

According to an advantageous development of the invention, it is provided that at least one operating mode awareness-relevant parameter is displayed in respective associated different colors on the image display device depending on whether said parameter is an actual value or a predicted future value thereof. This also contributes to a further improvement in the operating mode awareness of the pilot.

According to an advantageous development of the invention, it is provided that by actuating at least one display operating element of the automatic flight controller, predicted values of at least one operating mode awareness-relevant parameter are displayed on the image display device. This enables values of operating mode awareness-relevant parameters lying still further in the future to be displayed on the image display device, so that the pilot receives an overview further ahead in time.

According to an advantageous development of the invention, it is provided that by actuating at least one display operating element of the automatic flight controller the predicted values can be switched back and forth between different preview levels. This enables the predicted values to be switched back and forth between different time levels corresponding to the preview levels by manual operation.

The aforementioned object is further achieved by a computer program with program code means, designed to carry out a method of the type described above if the computer program is executed on a computer.

For this purpose, the computer program can for example be executed on a computer of the automatic flight controller. This also enables the advantages described above to be achieved.

BRIEF DESCRIPTION OF THE DRAWINGS

The invention is described below using exemplary embodiments and drawings.

In the figures.

DETAILED DESCRIPTION

Figure 1:
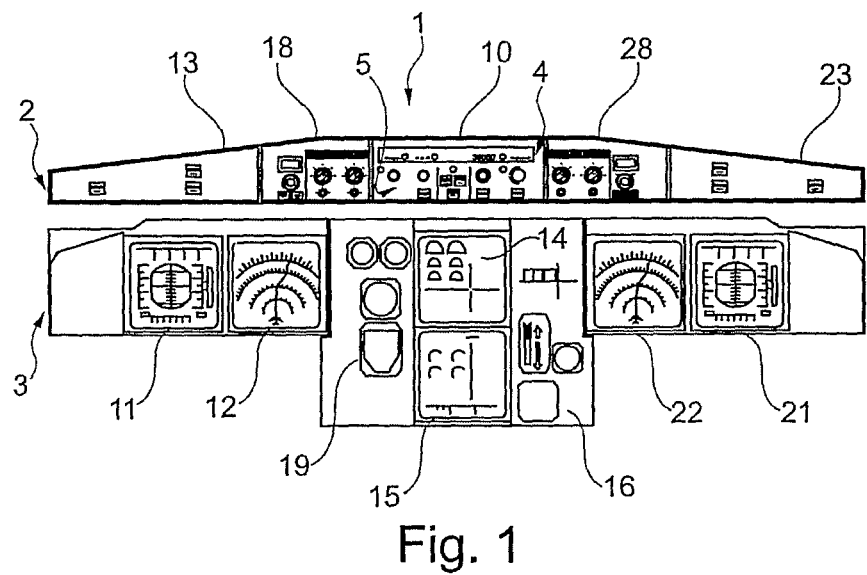
FIG. 1 shows an aircraft cockpit according to a first embodiment.

In the figures, the same reference characters are used for mutually corresponding elements.

The cockpit represented in FIG. 1 comprises a lower instrument region 3 and above this an upper instrument region 2 that is integrated within the glare shield. In the lower instrument region 3 there is the captain's primary flight display 11 in addition to the captain's navigation display 12. In the right region are disposed the first officer's primary flight display 21 and the first officer's navigation display 22. In the central region in the lower instrument region 3, there are an engine display 14, beneath this a multifunction display 15, a gear lever 16 and the standby instruments 19.

In the upper instrument region 2, the captain's Attention Getter Panel 13 is disposed on the left, the captain's EFIS Control Panel 18 next to it on the right. On the right are the first officer's Attention Getter Panel 23 and the first officer's EFIS Control Panel 28 in a mirror symmetrical arrangement. The automatic flight controller 1, at least in terms of the operating elements and display elements thereof, is disposed on the front 10 centrally between the above. Other parts of the automatic flight controller can also be disposed at other positions in the aircraft, in particular not in the cockpit. At least one display element 4 and various operating elements 5 are disposed on the front 10, for example for setting the target values flying altitude, flight direction, flying speed and similar. The set target values of the automatic flight controller can, at least in part, be displayed on the display element 4.

Figure 2:
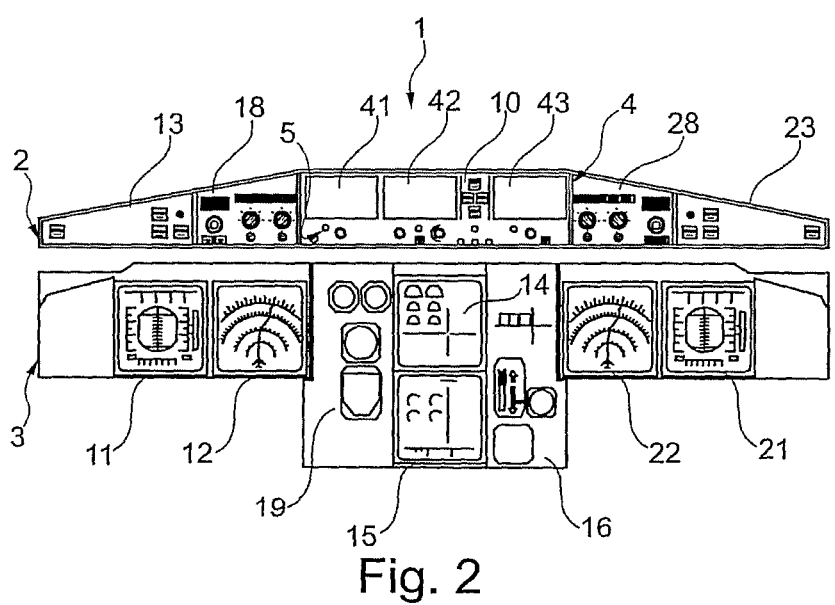
FIG. 2 shows an aircraft cockpit according to a second embodiment.

FIG. 2 shows a second embodiment of a cockpit that is improved compared to FIG. 1, in which in particular improvements regarding the display and the operation of the automatic flight controller 1 are present. The remaining elements described using FIG. 1 are implemented in the same way in FIG. 2.

It can be seen that in FIG. 2 there are three mutually separate displays 41, 42, 43 as display elements 4. With this the display space is significantly expanded compared to the first embodiment. The automatic flight controller according to FIG. 2 comprises still more operating elements 5 on the front 10 that will be described below using the enlarged display of the front 10 according to FIG. 3.

Figure 3:
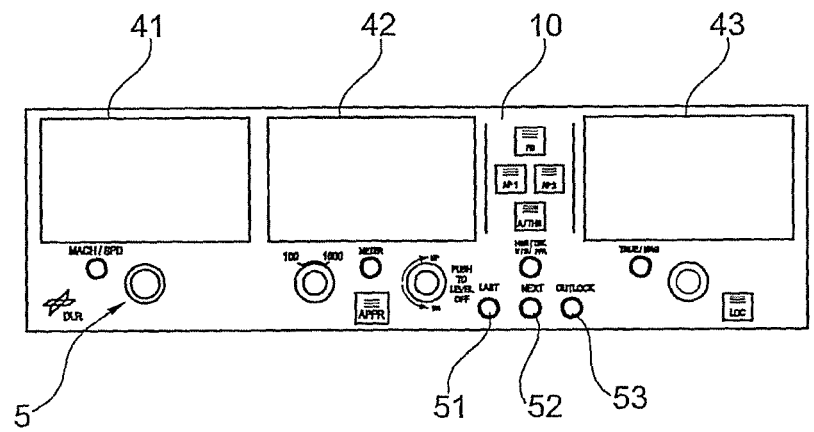
FIG. 3 shows a view of the front of an automatic flight controller.

As can be seen in FIG. 3, a Last operating element 51, a Next operating element 52 and an Outlook operating element 53 are present as additional operating elements of the automatic flight controller that were not present with the embodiment of FIG. 1, for example in the form of buttons. The operating elements 51, 52, 53 are additional display operating elements, with which the display contents displayed on the displays 41, 42, 43 can be changed to other displays.

Figure 4:
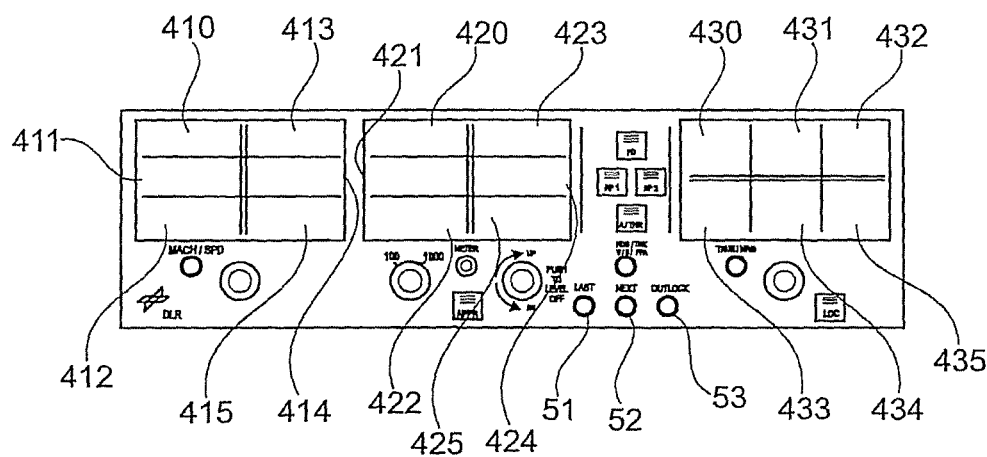
FIG. 4 shows the automatic flight controller according to FIG. 3 in operation.

FIG. 4 shows that the displays 41, 42, 43 can be divided into individual display fields, wherein in this exemplary embodiment a division into six display fields is assumed. In each of the display fields, certain operating mode awareness-relevant parameters can be output at different fixed positions depending on the state thereof or the change thereof.

The display 41 is divided into two columns with three rows. The output of the operating mode awareness-relevant parameters is carried out depending on the guidance parameter (parameter 3). Thus, for example, in the left column an output can be carried out if guidance is automatic, and in the right column if guidance is carried out by the pilot. In the three rows, either on the left or right, depending on the guidance, a physical variable that is influenced by the automatic flight controller is displayed depending on the rate of change thereof. Thus, for example, an autothrust display can be implemented by displaying an acceleration value in the topmost row, i.e. either in the display field 410 or in the display field 413, or by displaying a constant speed in the central row, i.e. in the display field 411 or in the display field 414, or by displaying a speed reduction in the bottom row, i.e. in the display field 412 or display field 415.

A value of the vertical flight direction can be output in the central display 42 in a comparable manner by the available display fields 420 to 425 depending on the guidance. Thus, a display of the vertical flight direction is carried out in the top row, i.e. in the display field 420 or in the display field 423, if a climb is being carried out, a display of the vertical flight direction in the central row, i.e. in the display field 421 or in the display field 424, for constant altitude, or a display of the vertical flight direction in the bottom row, i.e. in the display field 422 or in the display field 425, if a descent is being carried out.

In the display 43, the lateral flight direction can be displayed for example. Accordingly, the display 43 is divided into the six display fields 430 to 435 in a suitable way that is different from the previously described displays 41, 42. In this case, there are three columns and two rows. In this case, the guidance-dependent display is carried out either in the upper or in the lower row depending on the set guidance. The lateral flight direction is displayed in the three respective horizontally adjacently disposed display fields 430,431,432 or 433,434,435 depending on the guidance. Thus, for example, in the left column, i.e. in the display field 430 or in the display field 433, a display of the lateral flight direction is carried out if the aircraft is flying a left turn, in the central column, i.e. in the display field 431 or in the display field 34, if the aircraft is flying straight ahead, and in the right column, i.e. in the display field 432 or in the display field 435, if the aircraft is flying a right turn.

This enables an Auto Flight Control and Display Unit (ACDU) to be implemented with the automatic flight controller, as described below.

Display Concept of the Auto Flight Control and Display Unit (ACDU)

Division of the Displays of the ACDU

The ACDU comprises a display 41 for the display of information about the autothrust (A/THR), a display 42 for displaying information about the vertical Flight Directors and Autopilots (vertical FD/AP) and a display 43 for displaying information about the lateral Flight Directors and Autopilots (lateral FD/AP). Each of said displays 41, 42, 43 is divided into several display regions, in which the corresponding information is displayed.

The A/THR display 41 is divided vertically into three display regions and horizontally into two display regions. In the upper vertical display region, information is displayed if the resulting aircraft behavior is a positive acceleration. In the central vertical display region, information is displayed if the resulting aircraft behavior is maintaining the current speed. In the lower vertical display region, information is displayed if the resulting aircraft behavior is a slowing of the speed (negative acceleration). In the left horizontal display region, information is displayed if the guidance of the active operating mode is managed, i.e. is determined by means of the programmed flying route. In the right horizontal display region, information is displayed if the guidance of the active operating mode is selected, i.e. is determined by the pilot.

The vertical FD/AP display 42 is divided vertically into three display regions and horizontally into two display regions. In the upper vertical display region, information is displayed if the resulting aircraft behavior is a climb. In the central vertical display region, information is displayed if the resulting aircraft behavior is maintaining the current altitude. In the lower vertical display region, information is displayed if the resulting aircraft behavior is a descent. In the left horizontal display region, information is displayed if the guidance of the active operating mode is managed. In the right horizontal display region, information is displayed if the guidance of the active operating mode is selected.

The lateral FD/AP display 43 is divided horizontally into three display regions and vertically into two display regions. In the left horizontal display region, information is displayed if the resulting aircraft behavior is a left turn. In the central horizontal display region, information is displayed if the resulting aircraft behavior is maintaining the current course. In the right horizontal display region, information is displayed if the resulting aircraft behavior is a right turn. In the upper vertical display region, information is displayed if the guidance of the active operating mode is managed. In the lower vertical display region, information is displayed if the guidance of the active operating mode is selected.

Display of Target Values of Operating Modes

The target values of operating modes are displayed in the different display regions on the displays according to the effects on the aircraft behavior and the guidance of the operating modes.

Of the A/THR operating modes, the target speed and/or the target thrust are displayed as target values. Of the vertical FD/AP operating modes, the target altitude and/or the target vertical speed or the target flight path angle are displayed. Of the lateral FD/AP operating modes, the target heading or track and/or the target bank angle are displayed.

Display of the Guidance of Operating Modes

The guidance of operating modes is displayed by means of the color of the display of the target values and by means of the display of the target values in the different display regions of the displays.

Target values of active managed operating modes are displayed in magenta or green (for common operating modes). Target values of active selected operating modes are displayed in blue.

Target values of active managed A/THR operating modes are displayed in the left horizontal display region of the A/THR display. Target values of active selected A/THR operating modes are displayed in the right horizontal display region of the A/THR display. Target values of active managed vertical FD/AP operating modes are displayed in the left horizontal display region of the vertical FD/AP display. Target values of active selected vertical FD/AP operating modes are displayed in the right horizontal display region of the vertical FD/AP display. Target values of active managed lateral FD/AP operating modes are displayed in the upper vertical display region of the lateral FD/AP display. Target values of active selected lateral FD/AP operating modes are displayed in the lower vertical display region of the lateral FD/AP displays.

Display of Control Behavior of Operating Modes

The control behavior of operating modes with which resulting aircraft behavior target values are achieved is described. The control behavior is displayed using the display of target values and/or resulting values and using the display of the target values and resulting values in the different display regions. Resulting values are the same values as the target values (speed, thrust, altitude, vertical speed, flight path angle, course and bank angle), but do not constitute a target value for the relevant operating mode, but only a value resulting from another target value. Unlike target values, resulting values are not displayed in color on the displays.

The basic control behavior is displayed using the display of the target values and resulting values in the different display regions. The basic control behavior describes the resulting aircraft behavior according to the division of the displays. As the basic control behavior of the A/THR operating modes, whether the aircraft is accelerating, maintaining the speed thereof or decelerating is displayed by displaying the target values and resulting values in the three vertical display regions of the A/THR displays. As basic control behavior of the vertical FD/AP operating modes, whether the aircraft is climbing, maintaining the altitude thereof or descending is displayed by displaying the target values and resulting values in the three vertical display regions of the vertical FD/AP displays. As basic control behavior of the lateral FD/AP operating modes, whether the aircraft is turning left, maintaining course or turning right is displayed by displaying the target values and resulting values in the three horizontal display regions of the lateral FD/AP displays.

The exact control behavior is displayed using the display of target values and/or resulting values. As the exact control behavior of the A/THR operating modes, how the aircraft is accelerating, maintaining speed or decelerating is displayed by displaying the speed and the thrust. As the exact control behavior of the vertical FD/AP operating modes, how the aircraft is climbing, maintaining altitude or descending is displayed by displaying the altitude and the vertical speed or the flight path angle. As the exact control behavior of the lateral FD/AP operating modes, how the aircraft is turning left, holding course or turning right is displayed by displaying the course and the bank.

Display of Target Values and Resulting Values

| A/THR display | | Vertical FD/AP display | | Lateral FD/AP display | |
|---|---|---|---|---|---|
| Speed | Thrust | Altitude | Vertical Speed | Course | Bank |
| Example | | Example | | Example | |
| 250 kt | 80% | 4000 ft | +1500 ft/min | 180° | 20° |

Display of the Type/Name of Operating Modes

The type and the name of operating modes are displayed by displaying the target values and/or resulting values in combination with the color of the display of the target values and in combination with the display of the target values and/or resulting values in the different display regions of the displays. Each A/THR operating mode, vertical FD/AP operating mode and lateral FD/AP operating mode is uniquely displayed by means of said combination.

Preview, Review and Outlook Function

Each display of the ACDU comprises a Preview function, an Outlook function and a Review function.

The Preview function indicates the next expected transitions. The Preview function gives a preview of the next expected active operating modes, the expected guidance thereof, the control behavior thereof and the expected interactions thereof and a preview of the expected resulting aircraft behavior after activation of the respective operating modes. Each next expected transition is displayed in the different display regions on the display according to the expected effects on the aircraft behavior when activating the operating mode. Each next expected transition is displayed with the display of the target values and the display of the control behavior of the corresponding expected next active operating mode. In order to distinguish between the active and the next expected active operating modes, the target values of the next expected active operating modes are not displayed in color. Directional arrows indicate, starting from the active operating modes, in which display region on the displays the next expected active operating modes are displayed following activation. In this case, the type of the directional arrows gives information about the expected type of the transition. Filled directional arrows indicate automatic transitions. Dashed directional arrows indicate manual transitions. The color of the directional arrows shows the expected guidance of the active operating modes expected to be the next following activation. Arrows of transitions to expected active managed operating modes are displayed in magenta or green (for common operating modes). Arrows of transitions to expected active selected operating modes are displayed in blue. The display of the next expected manual transitions can be concealed with the Next control element 52 of the ACDU.

The Review function indicates the last transitions carried out. In this case, the Review function gives a look back at the last active operating modes, the guidance thereof, the control behavior thereof and the interactions thereof as well as a look back at the resulting aircraft behavior thereof. Each last completed transition is displayed in the different display regions on the displays according to the last effects thereof on the aircraft behavior. Each last completed transition is displayed with the display of the target values and the display of the control behavior of the corresponding last active operating mode. In order to distinguish between active and last active operating modes, the target values of the last active operating modes are not displayed in color. Directional arrows indicate in which display region on the displays the last active operating modes were displayed, starting from the active operating modes. In this case, the type of directional arrows gives information about the last type of transition. Filled directional arrows indicate automatic transitions. Dashed directional arrows indicate manual transitions. The color of the directional arrows shows the guidance of the last active operating modes. Arrows of transitions to last active managed operating modes are displayed in magenta or green (for common operating modes). Arrows of transitions to last completed active selected operating modes are displayed in blue. The Review function and the display thereof can be revealed and concealed with the Last operating element 51.

The Outlook function shows the future expected automatic transitions. Future expected transitions are the subsequent transitions from the next expected transitions. In this case, the Outlook function gives a preview of the future expected active operating modes, the expected control behavior thereof and the expected interactions thereof as well as a preview of the expected resulting aircraft behavior following automatic activation of the respective operating modes. The display of the future expected manual transitions can be revealed and concealed with the Outlook control element 53 of the ACDU.

Display of Transitions and Transition Conditions of Operating Modes

Mode transitions are displayed using the change of the display of the type or of the name of operating modes. In addition, the Preview function gives a preview of the next expected automatic operating mode transitions and, if a display is possible, of the next expected manual operating mode transitions. A display for manual transitions is only possible if the target value of the operating mode to be activated is selected prior to the activation thereof. If the operating mode is directly activated, no preview can be displayed. For the next expected automatic operating mode transitions, the Preview function shows the time running backwards to the automatic operating mode transition. Furthermore, the Review function gives a look back at the last automatic and manual operating mode transitions carried out. For the last operating mode transitions carried out, the Review function shows the time elapsed running backwards from the time of the last operating mode transition carried out.

Mode transition conditions are displayed for automatic and manual operating mode transitions by the Preview function. In this case, the Preview function shows the transition conditions that must be met so that the transition can be carried out.

Arrows for Transitions and Transition Conditions

| | | |
|---|---|---|
| Automatic transition to managed operating modes (color of the horizontal bar: magenta) | → | 00:30 ⇾ |
| Automatic transition to managed common operating modes (color of the horizontal bar: green) | → | 00:30 ⇾ |
| Automatic transition to selected operating modes (color of the horizontal bar: blue) | → | 00:30 ⇾ |
| Manual transition to managed operating modes (color of the horizontal bar: magenta) | → | ····⇾ |
| Manual transition to selected operating modes (color of the horizontal bar: blue) | → | ····⇾ |
| Manual transition to managed common operating modes (color of the horizontal bar: green) | → | ····⇾ |
| Display of operating mode transition conditions for automatic transitions to managed operating modes (color of the horizontal bar: magenta) | → | Reason ⇾ |
| Display of operating mode transition conditions for automatic transitions to managed common operating modes (color of the horizontal bar: green) | → | Reason ⇾ |
| Display of operating mode transition conditions for automatic transitions to selected operating modes (color of the horizontal bar: blue) | → | Reason ⇾ |

Display of Interactions of Operating Modes

Interactions of A/THR operating modes, vertical FD/AP operating modes and lateral FD/AP operating modes are displayed using the Preview function. The Preview function indicates whether further automatic operating mode transitions result owing to a transition for automatic operating mode transitions and, if a display is possible, for manual operating mode transitions. An indication for manual transitions is only possible if the target value of the operating mode to be activated is selected before the activation thereof. On the display of the operating mode transition, the Preview function indicates that there are resulting operating mode transitions. On the display with the resulting operating mode transition, the Preview function indicates the resulting operating mode transition and the cause thereof (interaction).

Status Bar of the ACDU

The status bar of the ACDU is displayed in the upper region of the A/THR displays, of the vertical FD/AP displays and of the lateral FD/AP displays. The approach capability of the auto flight systems, the set approach minima, the status of the autothrust, flight directors and autopilots and the selected operating mode settings of the ACDU (MACH or SPD and HDG/VS or TRK/FPA) are displayed on the status bar.

Display of Abnormal and Hazardous States

Abnormal flying states are indicated you yellow target values. In addition, the Preview function shows a preview of abnormal flying states with yellow arrows if this is possible.

Hazardous flying states are indicated by red target values. In addition, the Preview function indicates a preview of hazardous flying states by red arrows if this is possible.

The invention claimed is:

1. An automatic flight controller, comprising:
   operating elements for setting target settings;
   display elements for data display, wherein the display elements comprise at least two mutually separate displays that are disposed on a front of the automatic flight controller,
   wherein the automatic flight controller is configured to display one, several or all of the following mode awareness-relevant parameters on one or more of the at least two mutually separate displays of the automatic flight controller:
   a) transition conditions between operating modes of the automatic flight controller,
   b) control behavior of the automatic flight controller for achieving set target values,
   c) available interactions of a selected operating mode of the automatic flight controller with other operating modes of the automatic flight controller that are selectable,
   wherein the automatic flight controller is configured to display at least one of the operating mode awareness-relevant parameters in different regions of a single display element depending on whether a displayed value of said at least one operating mode awareness-relevant parameter was determined by human pilot input or automatically determined by a programmed flying route.

2. The automatic flight controller according to claim 1, wherein the operating elements comprise at least one display operating element, by the actuation of which at least some display contents of a display of the at least two mutually separate displays can be moved to another display of the at least two mutually separate displays-f.

3. The automatic flight controller according to claim 1, wherein the at least two mutually separate displays each comprise an image diagonal of at least 4 inches.

4. The automatic flight controller of claim 1, wherein the operating modes comprise one or more of an autothrust (A/THR) mode, vertical Flight Directors and Autopilots (vertical FD/AP) mode, and lateral Flight Directors and Autopilots (lateral FD/AP) mode.

5. The automatic flight controller of claim 1, wherein the transition conditions comprise different symbols which visually differentiate between an automatic transition performed by the automatic flight controller and a manual transition performed by the human pilot.

6. The automatic flight controller of claim 1, wherein the set target values comprise values for one or more of speed, thrust, altitude, vertical speed, flight path angle, course and bank angle.

7. The automatic flight controller of claim 6, wherein the control behavior for achieving the set target values comprises at least one of,
for an A/THR operating mode, accelerating, maintaining speed, or decelerating;
for a vertical FD/AP operating mode, climbing, maintaining altitude, or descending; or
for a lateral FD/AP operating mode, turning left, maintaining course, or turning right.

8. The automatic flight controller of claim 1, wherein the available interactions comprise indication of which operating modes are active simultaneously or which operating modes are available to be selected to be active simultaneously.

9. Aircraft cockpit with at least one automatic flight controller, wherein the at least one automatic flight controller comprises
operating elements for setting target settings;
display elements for data display, wherein the display elements comprise at least two mutually separate displays that are disposed on a front of the automatic flight controller,
wherein the automatic flight controller is configured designed to display one, several or all of the following mode awareness-relevant parameters set forth below on one or more of the at least two mutually separate displays of the automatic flight controller:
transition conditions between operating modes of the automatic flight controller,
control behavior of the automatic flight controller for achieving set target values,
available interactions of a selected operating mode of the automatic flight controller with other operating modes of the automatic flight controller that are selectable,
wherein the automatic flight controller is configured to display at least one of the operating mode awareness-relevant parameters in different regions of a single display element depending on whether a displayed value of said at least one operating mode awareness-relevant parameter was determined by human pilot input or automatically determined by a programmed flying route.

10. The aircraft cockpit according to claim 9, wherein the at least one automatic flight controller is integrated at least in part within a glare shield of the aircraft cockpit.

11. A method for operating an automatic flight controller, wherein information about an operating mode of the automatic flight controller is displayed on at least one image display device in an aircraft cockpit in order to bring about a mode awareness of a pilot for safe operation of an aircraft with the automatic flight controller activated, comprising the step of displaying one, several or all of the following mode awareness-relevant parameters on the at least one image display device:
a) transition conditions between operating modes of the automatic flight controller,
b) control behavior of the automatic flight controller for achieving set target values,
c) available interactions of a selected operating mode of the automatic flight controller with other operating modes of the automatic flight controller that are selectable,
wherein the displaying step displays at least one of the operating mode awareness-relevant parameters in different regions of the at least one image display device depending on whether a displayed value of said at least one operating mode awareness-relevant parameter was determined by human pilot input or automatically determined by a programmed flying route.

12. The method according to claim 11, wherein at least one display element of the automatic flight controller is used as the at least one image display device on which the one, several or all of the mode awareness-relevant parameters are displayed.

13. The method according to claim 11, wherein all mode awareness-relevant parameters are displayed on one or more display elements of the at least one image display device.

14. The method of claim 11, further comprising actuating at least one display operating element of the automatic flight controller to preview one or more of the mode awareness-relevant parameters.

15. The method according to claim 14, wherein by actuating the at least one display operating element of the automatic flight controller, at least some display contents of a display element of the automatic flight controller are moved to another display element of the automatic flight controller.

16. The method according to claim 11, wherein at least one of the mode awareness-relevant parameters is displayed at different fixed positions on the at least one image display device (depending on whether a flying state of the aircraft changes positively, changes negatively or remains the same for the at least one mode awareness-relevant parameter.

17. The method according to claim 11, wherein at least one of the mode awareness-relevant parameters is displayed at different fixed positions of the at least one image display device depending on whether a target value associated with at least one of the mode awareness-relevant parameters has been determined by the pilot or automatically based on a programmed flying route.

18. The method according to claim 11, wherein at least one of the mode awareness-relevant parameters is displayed in different colors on the at least one image display device depending on whether current values or future predicted values of said parameter are being displayed.

19. The method according to claim 11, further comprising actuating at least one display operating element of the automatic flight controller to display predicted values of at least one of the mode awareness-relevant parameters on the at least one image display device.

20. The method according to claim 11, wherein by actuating the at least one display operating element of the automatic flight controller the predicted values can be switched back and forth between different preview levels.

21. A computer program product for operating an automatic flight controller, the computer program product comprising a computer readable storage medium having program code embodied therewith, the program code being executable by a computer to cause the computer to perform the method according to claim 11.

* * * * *